United States Patent [19]

Uchiyama

[11] Patent Number: 5,242,761
[45] Date of Patent: Sep. 7, 1993

[54] MAGNETIC RECORDING MEDIUM COMPRISING NIFE AND COZR ALLOY CRYSTALLINE MAGNETIC ALLOY LAYERS AND A CO-CR VERTICALLY MAGNETIZABLE LAYER

[75] Inventor: Yoichi Uchiyama, Yokohama, Japan

[73] Assignee: Digital Equipment Corporation Japan, Tokyo, Japan

[21] Appl. No.: 547,669

[22] Filed: Jul. 3, 1990

[51] Int. Cl.$^5$ .............................. G11B 5/00
[52] U.S. Cl. ..................... 428/694; 428/64; 428/336; 428/611; 428/668; 428/900; 428/928; 427/131; 204/192.15; 204/192.2
[58] Field of Search ............... 428/336, 694, 900, 611, 428/668, 64, 928; 427/131; 204/192.15, 192.2

[56] References Cited

U.S. PATENT DOCUMENTS

| | | | |
|---|---|---|---|
| 4,414,287 | 11/1983 | Kneller et al. | 428/650 |
| 4,657,824 | 4/1987 | Howard | 428/611 |
| 4,950,548 | 8/1990 | Furusawa et al. | 428/611 |

FOREIGN PATENT DOCUMENTS

| | | |
|---|---|---|
| 57-208630 | 12/1982 | Japan. |
| 57-208631 | 12/1982 | Japan. |
| 59-75429 | 4/1984 | Japan. |
| 59-098321 | 6/1984 | Japan. |
| 61-188728 | 8/1986 | Japan. |
| 61-267927 | 11/1986 | Japan. |

Primary Examiner—Paul J. Thibodeau
Assistant Examiner—Steven A. Resan
Attorney, Agent, or Firm—Barry N. Young; Ronald C. Hudgens

[57] ABSTRACT

A magnetic recording medium and method of manufacture therefor uses a vertically magnetized film (4) backed by a nonmagnetic substrate (1) made of e.g., glass; a Permalloy ® layer is interposed between the magnetized film and the substrate. An additional layer (3) of a soft amorphous magnetic material, e.g. Co-Zr-Nb or Co-Zr of a suitable thickness (e.g. 50 nm) is interposed between the vertically magnetized medium and the Permalloy ® layer for improving crystalline orientation of the vertically magnetized film and the Permalloy ® layer. The additional layer (3) may be deposited by high frequency sputtering while applying a magnetic field othogonal to the substrate.

10 Claims, 2 Drawing Sheets

MAGNETIC RECORDING MEDIUM COMPRISING NIFE AND COZR ALLOY CRYSTALLINE MAGNETIC ALLOY LAYERS AND A CO-CR VERTICALLY MAGNETIZABLE LAYER

BACKGROUND OF THE INVENTION

1. Field of the Invention

This invention relates to improvements in a vertical magnetic recording medium used for a vertical magnetic recording.

2. Description of the Prior Art

Heretofore, there is known a vertical magnetic recording medium used for a vertical magnetic recording, in which a vertically magnetized film made of a thin alloy film containing Co and Cr as main ingredients is provided on a nonmagnetic substrate. The thin alloy film which contains Co-Cr as main ingredients has a hexagonal close-packed structure as its crystal structure to generate a vertical magnetic anisotropy in such a manner that its C axis is oriented vertically to the surface of the film. It is to be noted that in order to form a preferably vertical magnetic recording medium, its C-axis orientation must be excellent. It is known that, for forming such a medium, a 2-layer medium having a Permalloy ® film provided between nonmagnetic substrate and a vertically magnetized film improves its reproduction output as compared with a structure having no Permalloy ® film. The Permalloy ® film displays magnetic saturation at a high level such as 10,000 gauss and displays large specific permeability such as approx. 3,000, and is optimum as a soft magnetic layer of a 2-layer medium. However, the crystal orientation of the Permalloy ® film on the nonmagnetic substrate is not conducive enough for high efficiency, and it is difficult to obtain a preferred high degree of crystal orientation with the vertically magnetized film form thereon owing to the influence of the crystal orientation of the Permalloy ® film. A relatively thick film (approx. 1,000 nm) is required as compared with the recording layer as the Permalloy ®. Even though a Permalloy ® structure manufactured by a plating method and having a large thickness can be simply obtained with high productivity, its crystal orientation is significantly unfavorable. Available prior art teaches several arrangements directed to improve the orientation property of a combination of a Permalloy ® film and a Co-Cr film.

In order to control the deterioration of the crystal orientation of the vertically magnetized film formed on a soft base layer made of Permalloy ®, a vertical magnetic recording medium is heretofore proposed, as disclosed in Japanese Patent Laid-open Sho 59-75429 official gazette, in which a Ti film is provided between a soft base layer and a vertically magnetized film to improve the crystal orientation of the vertically magnetized film by utilizing the crystal orientation of the Ti film. There is also proposed, as disclosed in Japanese Patent Laid -open Sho 57-208630 official gazette, a vertical magnetic recording medium in which a nonmagnetic and amorphous layer made of $SiO_2$ or $Al_2O_3$ film is provided as an intermediate layer between a soft base layer and a vertically magnetized film to similarly improve the crystal orientation of the vertically magnetized film. Further, there is also proposed, as disclosed in Japanese Patent Laid-open Sho 61-267927 official gazette, a vertical magnetic recording medium in which a soft magnetic amorphous film made of Co-Zr-Mo is used as an intermediate layer.

However, since the intermediate layer is nonmagnetic in the conventional vertical magnetic recording medium using the above-described Ti, $SiO_2$ or $Al_2O_3$ film as the intermediate layer, the magnetic coupling of the vertically magnetized film to the soft base layer is not so effective, with the result that the improvement in its recording efficiency is still insufficient. Further, even in case of the vertical magnetic recording medium which has the amorphous soft magnetic Co-Zr-Mo layer as the intermediate layer, its orientation is not as desired.

An object of the present invention is to provide a vertical magnetic recording medium and a method of manufacturing the same which can obviate the problems of the above-described prior art.

SUMMARY OF THE INVENTION

The invention in its broad form resides in a vertical magnetic recording medium comprising a vertically magnetized film backed by a nonmagnetic substrate and including a crystalline soft magnetic layer interposed between said vertically magnetized film and said substrate, said magnetic recording medium including an additional relatively thin film of soft magnetic material arranged between said vertically magnetized film and said crystalline magnetic layer, whereby any crystal orientation in said vertically magnetized film and any crystal orientation in said crystalline soft layer is improved, at the same time effecting improvement in magnetic coupling between said vertically magnetized film and said crystalline soft magnetic layer.

As described herein, a preferred embodiment has a vertically magnetized film backed by a crystalline soft magnetic layer on a nonmagnetic substrate, the medium comprising an additional Co-Zr-Nb film or a Co-Zr film interposed between the crystalline soft magnetic layer and the vertically magnetized film.

The invention also consists in a method of manufacturing a vertical magnetic recording medium of the type comprising a vertically magnetized film backed by a nonmagnetic substrate and including a crystalline soft magnetic layer interposed between said vertically magnetized film and said substrate, said method further including the step of depositing an additional relatively thin film of soft magnetic material between said vertically magnetized film and said crystalline magnetic layer, whereby, any crystal orientation in said vertically magnetized film and any crystal orientation in said crystalline soft layer is improved, at the same time effecting improvement in magnetic coupling between said vertically magnetized film and said crystalline soft magnetic layer.

As described herein, a preferred embodiment includes the steps of forming a crystalline soft magnetic layer on a nonmagnetic substrate, forming an additional Co-Zr-Nb film or a Co-Zr film on the crystalline soft magnetic layer by high frequency sputtering while applying a magnetic field in a direction vertical to the surface of a target; further, dc or high frequency magnetron sputtering can be used to form a vertically magnetized film on the Co-Zr-Nb film or Co-Zr film.

BRIEF DESCRIPTION OF THE DRAWINGS

A more detailed understanding of the invention may be had from the following description of a preferred embodiment, given by way of example only and to be read in conjunction with the accompanying drawings wherein.

DESCRIPTION OF THE PREFERRED EMBODIMENTS

Figure 1:
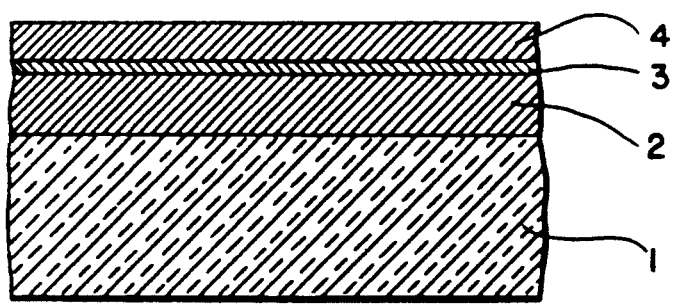
FIG. 1 is a schematic view showing an enlarged sectional structure of a vertical magnetic recording medium illustrating an embodiment of the present invention.

Referring now to FIG. 1, a vertical magnetic recording medium according to preferred embodiment of this invention comprises a Permalloy ®, film 2 as a crystalline soft magnetic layer, a Co-Zr-Nb film 3 and a Co-Cr film 4 laminated on a glass substrate or board 1 as a nonmagnetic substrate.

Such a vertical magnetic recording medium is preferably formed as described below.

The Permalloy ® film 2 is formed to be about 500 nm thick by a high frequency sputtering method on the glass substrate or board 1; the Co-Zr-Nb film 3 is then similarly formed to be about 50 nm thick on the Permalloy ® film 2, and the Co-Cr film 4 is further formed to be about 300 nm thick by a dc magnetron sputtering method thereon. Here, the target composition of the Co-Cr formed by the sputtering contains 81.9 wt. % of Co and 18.1 wt. % of Cr. The Permalloy ® composition contains 81 wt. % of Ni, 19 wt. % of Fe, whereas the Co-Zr-Nb composition contains 86.9 wt % of Co, 3.8 wt. % of Zr, and 9.3 wt. % of Nb. The substrate temperature at the time of forming the Co-Cr film 4 maybe ambient temperature (e.g., 23° C.). The percentage composition indicated herein for the Co-Zr-Nb film is only exemplary, and other compositions can be used too, after making slight alterations in the percentages so long as the composition is limited to Co-Zr-Nb or Co-Zr as described and claimed. Furthermore, the method of depositing films by high frequency sputtering in itself is not purportedly novel, and is preferably used herein for depositing the Permalloy ® film 2, as well as the additional films of Co-Zr-Nb or Co-Zr as the case may be. Accordingly a more detailed description of film deposition by high frequency sputtering is not provided herein.

In order to confirm the degree of the improvement in the C-axis orientation of the vertical magnetic recording medium of the arrangement as described above, the result of experiments by an X-ray diffraction is summarized in the following Table 1.

Figure 2:
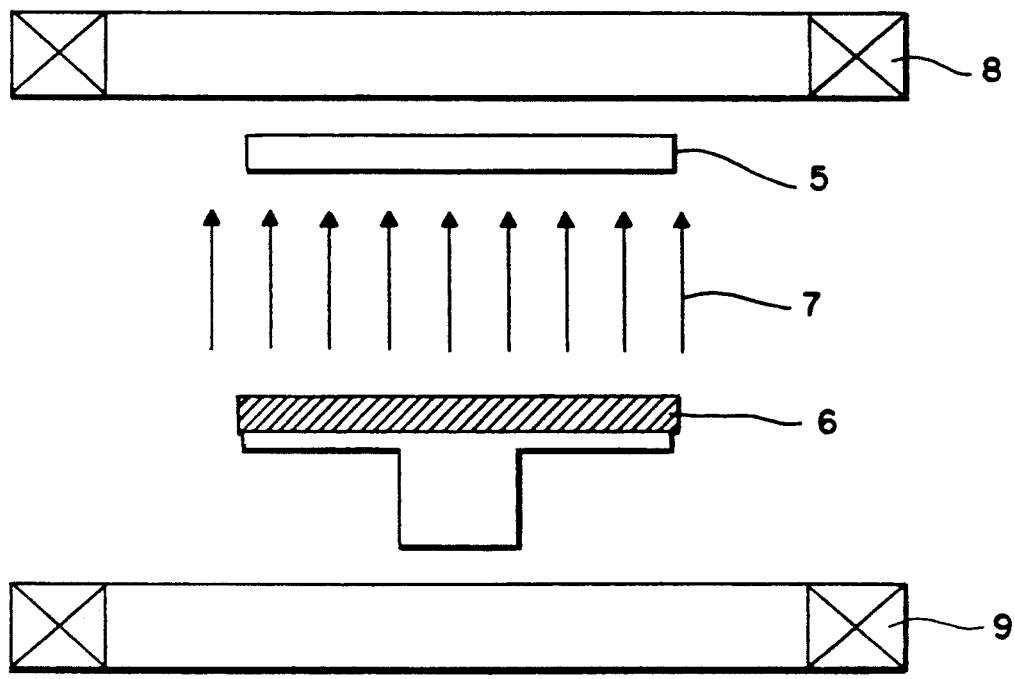
FIGS. 2 and 3 are schematic views for explaining a method of manufacturing a vertical magnetic recording medium according to a preferred embodiment of the present invention.

Here, a magnetic field applied at the time of the manufacture of the Co-Zr-Nb film is controllably changed. As shown in FIG. 2, the magnetic field may be applied by providing suitable dc magnetic coils 8 and 9 as to hold a board 5 (board 1) and a target 6 to apply a dc magnetic field 7 vertically to the face of the target in a space above the target 6. The direction of the magnetic field 7 may be reverse to that as shown.

The C-axis orientation of the Co-Cr film of the medium when the Co-Zr-Nb layer is not provided is shown in Note 1 below the Table 1.

TABLE 1

| Magnetic field applied at manufacture of Co—Zr—Nb film (Oe) | | 15 | 20 | 40 | 60 |
|---|---|---|---|---|---|
| C-Axis orientation of Co—Cr film (degrees) | >10 | 4.1 | 3.7 | 3.5 | 3.3 |

Note 1:
C axis orientation of Co—Cr film having no Co—Zr—Nb film 5.4 degrees

In the Table 1, the C-axis orientation represents the half width of a locking curve of the plane (00.2) of the Co-Cr film in the medium.

As understood from the Table 1, it is apparent that the C-axis orientation of the 3-layer medium having the Co-Zr-Nb layer of 50 nm thickness is improved by applying the magnetic field 7 in some degree as compared with the conventional 2-layer medium having no Co-Zr-Nb layer. Here, the board temperature is set to the ambient temperature, but even if the board temperature is raised from the ambient temperature to approx. 300° C., similar results are obtained.

Figure 3:
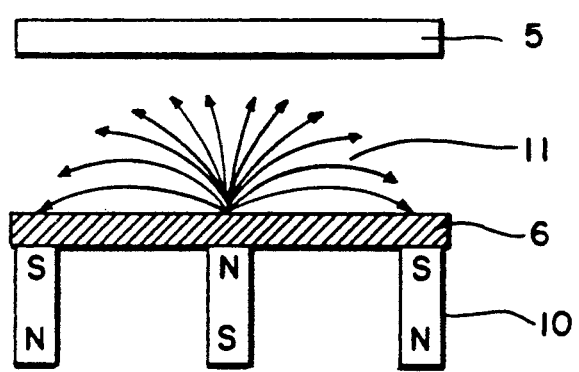

As described above, the orientation of the Co-Cr of the 2-layer medium made of Permalloy ®, and Co-Cr is caused to deteriorate by the influence of the orientation of the Permalloy ® layer; however, when the Co-Zr-Nb film is provided as the intermediate layer therebetween in a so-called 3-layer medium as described herein, the disorder in the crystal orientation of the Permalloy ®, is alleviated; the crystal orientation of the Co-Cr is improved to produce a highly desirable vertical magnetic recording medium. In the embodiment described above, as shown in FIG. 2, the magnetic field 7 is externally applied to be generally orthogonal or perpendicular to the substrate. However, the present invention is not limited to the particular embodiment. As shown in FIG. 3, an external magnetic field and the associated paraphernalia may be omitted by employing a leakage magnetic field 11 produced by a dc or high frequency magnetron sputtering method in which magnets 10 are arranged under a target 6, wherein the leakage magnetic field is orthogonal to the substrate.

Figure 4:
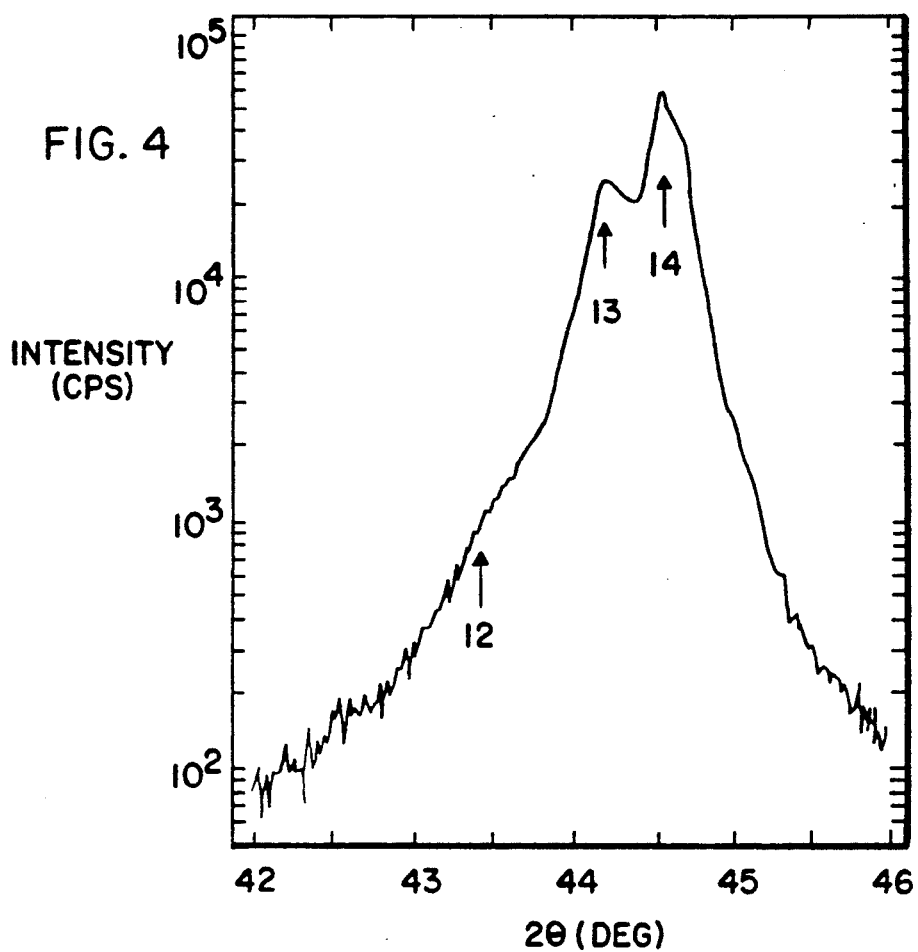
FIG. 4 is a view showing the X-ray diffraction pattern of a 3-layer medium manufactured by applying 60 Oe of magnetic field during deposition the Co-Zr-Nb film in the preferred embodiment of the present invention.
Figure 5:
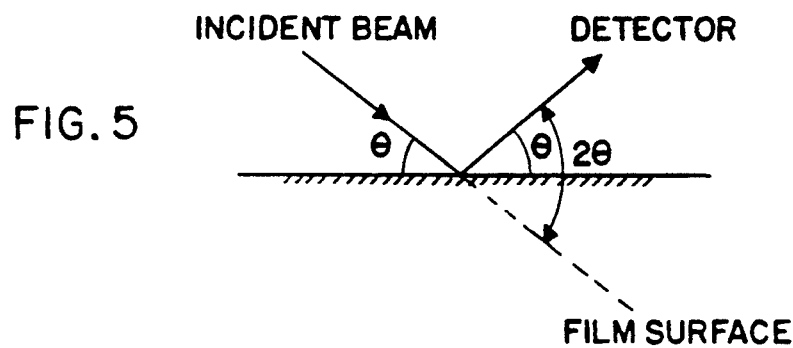
FIG. 5 is a representation of the X-ray diffraction arrangement from which the view of FIG. 4 was developed.

The C-axis orientation of the Co-Cr film on the Co-Zr-Nb layer is additionally improved by applying a magnetic field thereto during deposition of the Co-Zr-Nb layer. As shown in FIG. 4, a peak 12 or the fine crystal in the Co-Zr-Nb layer is observed in an X-ray diffraction pattern (beam source Cu-Kα) by applying a magnetic field thereto. It is to be noted that the fine crystal of the Co-Zr-Nb layer is slightly influenced to derive vertical magnetic anisotropy by the magnetic field. It is also to be noted that the Co-Zr-Nb layer per se is influenced to derive vertical magnetic anisotropy by the magnetic field. FIG. 4 shows a curve representing the strengths of X-rays diffracted from the three superimposed films, a Permalloy ® (NiFe) film 2, a Co-Zr-Nb film 3 and a Co-Cr film 4 of the substrate 1 when X-ray from a source of Cu-Kα radiates on the top surface of the three superimposed films while changing an angle of incidence of X-ray onto the top surface. Referring to FIGS. 4 and 5, the axis of ordinates indicates the strength (cps) of diffracted X-rays and the axis of abscissas indicates the angle (deg) between the incident and reflected beams, and, the half value of abscissas indicates the angle of incidence of x-ray on to the top surface of the three films. The X-ray diffraction pattern may be considered to mean the curve shown in FIG. 4.

In FIG. 4 reference numeral 13 indicates a peak of the strength of X-ray diffraction obtained through the crystal face represented by the symbol (111) of the Permalloy ® (NiFe) film and reference numeral 14 indicates a peak of the strength of X-ray diffraction obtained through the crystal face represented by the symbol (00.2) of the Co-Cr film.

It is noted that in the embodiment described above, the Co-Zr-Nb film is provided between the Permalloy ® film and the Co-Cr film. However, even if a Co-Zr film is provided instead of the Co-Zr-Nb film, a peak is observed in the X-ray diffraction pattern by similarly applying a magnetic field thereto, the similar effects can be expected. The present invention includes the embodiment wherein a Co-Zr film is provided in lieu of the preferred Co-Zr-Nb film.

Since the Co-Zr-Nb film and the Co-Zr film are soft and magnetically different from the Ti, $SiO_2$, $Al_2O_3$ films, it is seen that the magnetic coupling between the Permalloy ® film and the vertically magnetized film is strengthened. The orientation is further improved as compared with the case of the Co-Zr-Mo film which is an amorphous soft magnetic film (C-axis orientation: 7.8 degrees). In the case of the embodiment described above, since the crystal orientation of the Permalloy ®, film is relatively improved, the crystal orientation of the Co-Cr film formed thereon is also improved. The present invention is highly effective on Permalloy ® films having wrong or unfavorable crystal orientation, manufactured by a plating method, etc.

According to the present invention as described with reference to preferred embodiments hereinabove, there is provided a vertical magnetic recording medium having a vertically magnetized film backed by a crystalline soft magnetic layer on a nonmagnetic substrate, the recording medium including a Co-Zr-Nb film or a Co-Zr film formed between the crystalline soft magnetic layer and the vertically magnetized film, thereby improving the crystal orientation of the vertically magnetized film.

As described above, the conventional vertical magnetic recording medium deteriorates by the influence of the poor orientation of the conventional 2-layer medium made of the Permalloy ® and the Co-Cr film. In contrast, in the present invention, the Co-Zr-Nb film or the Co-Zr film is provided as the intermediate layer therebetween forming the inventive 3-layer medium thereby alleviating the influence of the disorder in the crystal orientation of the Permalloy ® film, thereby improving the crystal orientation of the Co-Cr and generating a highly desirable vertical magnetic anisotropy. Further, since the Co-Zr-Nb is fine crystalline as observed in the X-ray diffraction pattern, it follows that the crystal grain size in the lateral direction of the Co-Cr film grown thereon is likewise small, and consequently, the medium of the invention is highly suitable for high density magnetic recording. Additionally, since the Co-Zr-Nb and Co-Zr films are soft magnetic and are different from the Ti film of the conventional 3-layer medium, the magnetic coupling between the Permalloy ®, and the vertically magnetized Co-Cr film is significantly strengthened, by following the construction and method of forming the medium as described hereinabove.

While the description hereinabove refers to preferred embodiments of the invention, it is envisaged that various modifications of the preferred embodiments of the structure and method of fabricating the medium of the invention are conceivable; it is intended that all such modifications are covered by the scope of the present invention which is as defined in the appended claims.

I claim:

1. A magnetic recording medium comprising a vertically magnetizable film backed by a non-magnetic substrate and including a crystalline soft magnetic layer interposed between said vertically magnetizable film and said substrate, said magnetic recording medium including an additional film of magnetic material arranged between said vertically magnetizable film and said crystalline soft magnetic layer, said magnetic material being sufficiently crystalline to produce a corresponding X-ray diffraction peak substantially smaller than peaks produced by said vertically magnetizable film and said crystalline soft magnetic layer.

2. A magnetic recording medium as in claim 1 wherein said vertically magnetizable film comprises Co-Cr and, said crystalline soft magnetic layer comprises NiFe and wherein said additional film of magnetic material comprises Co-Zr-Nb.

3. A magnetic recording medium as in claim 1 wherein said vertically magnetizable film comprises Co-Cr and, said crystalline soft magnetic layer comprises NiFe and wherein said additional film of magnetic material comprises Co-Zr-Nb in the % composition of 86.9% Co, 3.8% Zr and 9.3% Nb, by weight.

4. A magnetic recording medium as in claim 1 wherein said additional film of magnetic material comprises Co-Zr.

5. A method of producing a magnetic recording medium having a vertically magnetizable film backed by a non-magnetic substrate and including a crystalline soft magnetic layer interposed between said vertically magnetizable film and said substrate, said method including the step of depositing an additional film of magnetic material between said vertically magnetizable film and said crystalline soft magnetic layer such that said magnetic material is sufficiently crystalline to produce a corresponding X-ray diffraction peak substantially smaller than peaks produced by said vertically magnetizable film and said crystalline soft magnetic layer.

6. A method of producing a magnetic recording medium as in claim 5, including the step of controlling said additional film of magnetic material to be 50 nm in thickness.

7. A method of producing a magnetic recording medium as in claim 5, wherein said depositing step further comprises depositing said additional film by high frequency sputtering while applying a magnetic field in a direction substantially orthogonal to the substrate surface.

8. A method as in claim 5 wherein said step of depositing further comprises depositing said additional film by high frequency or d.c. magnetron sputtering using a leakage magnetic field applied in a direction substantially orthogonal to the substrate surface.

9. A magnetic recording medium as in claim 1 wherein said additional film is approximately 50 nm in thickness.

10. A method as in claims 7 or 8 wherein said magnetic field has a strength of 60 Oersteds.

* * * * *